(12) United States Patent
Li et al.

(10) Patent No.: US 11,340,576 B2
(45) Date of Patent: May 24, 2022

(54) METHOD AND APPARATUS FOR ESTIMATING SYSTEM ERROR OF COMMISSIONING TOOL OF INDUSTRIAL ROBOT

(71) Applicant: ABB Schweiz AG, Baden (CH)

(72) Inventors: Cheng Li, Shanghai (CN); Hao Gu, Shanghai (CN); Jihuan Tian, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 319 days.

(21) Appl. No.: 16/584,090

(22) Filed: Sep. 26, 2019

(65) Prior Publication Data
US 2020/0019136 A1    Jan. 16, 2020

Related U.S. Application Data

(63) Continuation of application No. PCT/CN2017/078263, filed on Mar. 27, 2017.

(51) Int. Cl.
*B25J 9/16* (2006.01)
*G05B 19/401* (2006.01)
*G06F 3/041* (2006.01)

(52) U.S. Cl.
CPC .......... *G05B 19/401* (2013.01); *B25J 9/1692* (2013.01); *B25J 9/1697* (2013.01); *G05B 2219/36431* (2013.01); *G05B 2219/40003* (2013.01)

(58) Field of Classification Search
CPC .................. G05B 19/18; G05B 19/401; G05B 2219/36431; G05B 2219/40003;
(Continued)

(56) References Cited

U.S. PATENT DOCUMENTS

2005/0065653 A1   3/2005 Ban et al.
2005/0225278 A1*  10/2005 Ban ........................ B25J 9/1692
                                                318/568.11
(Continued)

FOREIGN PATENT DOCUMENTS

CN        1680774 A       10/2005
CN      102419902 A        4/2012
(Continued)

OTHER PUBLICATIONS

European Patent Office, Extended Search Report issued in corresponding Application No. 17902752.9, dated Sep. 25, 2020, 11 pp.
(Continued)

*Primary Examiner* — Khoi H Tran
*Assistant Examiner* — Sarah A Tran
(74) *Attorney, Agent, or Firm* — Greenberg Traurig, LLP

(57) ABSTRACT

The present disclosure relates to a method and apparatus for estimating a systematic error of a commissioning tool of an industrial robot, the industrial robot including an operational tool and an application camera, the commissioning tool including a touchscreen and a stylus, the method including: a driving step of driving the operational tool to rotate around a preset rotation axis; a first image obtaining step of obtaining a plurality of first images of the operational tool during rotation; and a first offset calculating step of calculating a first offset of the stylus relative to the operational tool according to the plurality of first images, so as to obtain the systematic error.

20 Claims, 8 Drawing Sheets

(58) Field of Classification Search
CPC . G05B 2219/39045; B25J 9/16; B25J 9/1679;
B25J 9/1692; B25J 9/1694; B25J 9/1697;
G06F 3/041; G06F 3/0416; G06F 3/0418
USPC ........................................................ 700/254
See application file for complete search history.

(56) References Cited

U.S. PATENT DOCUMENTS

| | | | |
|---|---|---|---|
| 2012/0146956 A1* | 6/2012 | Jenkinson | G06F 3/0418 345/178 |
| 2013/0035791 A1 | 2/2013 | Chiu et al. | |
| 2015/0142171 A1 | 5/2015 | Li et al. | |
| 2016/0288333 A1 | 10/2016 | Yamaguchi et al. | |

FOREIGN PATENT DOCUMENTS

| | | | |
|---|---|---|---|
| CN | 102581745 A | 7/2012 |
| CN | 106426172 A | 2/2017 |
| CN | 106468971 A | 3/2017 |
| JP | 2013210331 A | 10/2013 |

OTHER PUBLICATIONS

Intellectual Property Office of the P.R. China, International Search Report & Written Opinion issued in corresponding Application No. PCT/CN2017/078263, dated Dec. 7, 2017, 8 pp.
Chinese Office Action, issued by the China National Intellectual Property Administration, regarding corresponding patent application Serial No. CN 201780089040.X; dated Mar. 2, 2022; 10 pages (with English translation).

* cited by examiner

METHOD AND APPARATUS FOR ESTIMATING SYSTEM ERROR OF COMMISSIONING TOOL OF INDUSTRIAL ROBOT

FIELD OF INVENTION

The present disclosure relates to the field of error estimation, and more specifically, to a method for estimating a systematic error of a commissioning tool of an industrial robot.

BACKGROUND OF INVENTION

Typically an industrial robot may include an application camera and an operational tool which is mounted at the end of its arm. Different operational tools may be used for different operation objects and tasks. The application camera may function as the robot's eyes to assist the robot to move and locate by obtaining and analyzing images.

While mounting the industrial robot in a practical application environment, a series of calibration and configuration work needs to be completed, and the work is commonly known as industrial robot commissioning.

WO2016/154995A1 discloses a method for industrial robot commissioning and an industrial robot system, wherein a touchscreen on a mobile device such as a mobile phone is used as a commissioning tool in industrial robot commissioning, so as to perform industrial robot commissioning in an automated and convenient way. In the commissioning process, commissioning tools further include a stylus which is mounted at the end of the robot's arm and which may touch the touchscreen.

However, the introduction of these commissioning tools will bring about extra systematic errors. For example, when performing Tool Center Point calibration by using a stylus, a center point obtained from the calibration is actually the position of the stylus, and the position of the stylus has a fixed offset relative to the position of an operational tool of a robot.

In addition, the touchscreen usually comprises a touch frame and a display frame, and there is also an offset between coordinate systems for the two frames.

So far the prior art has not disclosed any technical solution that can calculate the above offsets.

Therefore, there is a need to provide a method and apparatus for estimating systematic errors of a commissioning tool of an industrial robot, so as to solve the above technical problems in the prior art.

SUMMARY OF INVENTION

It is an objective of the present disclosure to provide a method and apparatus for estimating a systematic error of a commissioning tool of an industrial robot.

According to one aspect of the present disclosure, there is provided a method for estimating a systematic error of a commissioning tool of an industrial robot, the industrial robot comprising an operational tool and an application camera, the commissioning tool comprising a touchscreen and a stylus, the method comprising: a driving step of driving the operational tool to rotate around a preset rotation axis; a first image obtaining step of obtaining a plurality of first images of the operational tool during rotation; and a first offset calculating step of calculating a first offset of the stylus relative to the operational tool according to the plurality of first images, so as to obtain the systematic error.

According to another aspect of the present disclosure, there is provided an apparatus for estimating a systematic error of a commissioning tool of an industrial robot, the industrial robot comprising an operational tool and an application camera, the commissioning tool comprising a touchscreen and a stylus, the apparatus comprising: a driving module arranged to drive the operational tool to rotate around a preset rotation axis; a first image obtaining module arranged to obtain a plurality of first images of the operational tool during rotation; and a first offset calculating module arranged to calculate a first offset of the stylus relative to the operational tool according to the plurality of first images, so as to obtain the systematic error.

With the method and apparatus for estimating a systematic error of a commissioning tool of an industrial robot as provided by the present disclosure, the systematic error of the industrial robot during commissioning can be calculated automatically without any hardware device being added, thereby increasing the calibration precision of the industrial robot during commissioning.

BRIEF DESCRIPTION OF THE DRAWINGS

The present invention may be better understood by description of embodiments of the present invention, with reference to the accompanying drawings, wherein, FIG. 1 schematically shows a flowchart of a method for estimating a systematic error of a commissioning tool of an industrial robot according to one embodiment of the present invention.

Throughout the figures, same or similar reference numbers indicate same or similar elements.

DETAILED DESCRIPTION OF EMBODIMENTS

Description is presented below to specific embodiments of the present invention. It should be noted while describing the embodiments, this specification might not thoroughly describe all features of actual embodiments for the sake of brevity. It should be understood during actual implementation of any one embodiment, just as in the course of any one engineering project or design project, in order to achieve specific objectives of developers and satisfy system-related or business-related restrictions, usually a variety of concrete policies will be made, which also leads to changes from one embodiment to another embodiment. In addition, it may be understood though efforts made during such development might be complicated and tedious, to those of ordinary skills in the art related to content disclosed by the present invention, some variations to design, manufacture or production as made on the basis of technical content disclosed in the present disclosure are merely conventional technical means, and content of the present disclosure should not be construed as being insufficient.

Unless otherwise defined, technical or scientific terminology used in the claims and specification should be general meaning as interpreted by those of ordinary skills in the art. The words "first", "second" and the like are not to be read as any order, amount or importance but only are used to distinguish different components. The word "one" is not to be read as any amount restriction but is to be read as "at least one". The word "comprise" or "include" and the like means an element or article preceding "comprise" or "include" contains an element or article and equivalent elements as enumerated after "comprise" or "include", and does not exclude other element or article. The word "connect" or "link" and the like is neither limited to physical or mechanical connection nor limited to direct or indirect connection.

To make the objective, technical solution and advantages of the present invention clearer, the technical solution of the present invention will be clearly and completely described with reference to the specific embodiments and the accompanying drawings of the present invention. Obviously, the embodiments to be described are merely part of embodiments of the present invention, rather than all embodiments. Based on the embodiments of the present invention, all other embodiments as made by those of ordinary skills in the art without the exercise of any inventive skill should fall in the protection scope of the present invention.

Commissioning tools of an industrial robot may include a stylus, a touchscreen and a commissioning camera. The stylus may be mounted at the end of the robot's arm, for clicking on the touchscreen. The commissioning camera may be integrated with the touchscreen, for example, the commissioning camera may be a camera in a mobile phone or a tablet computer.

Figure 1:
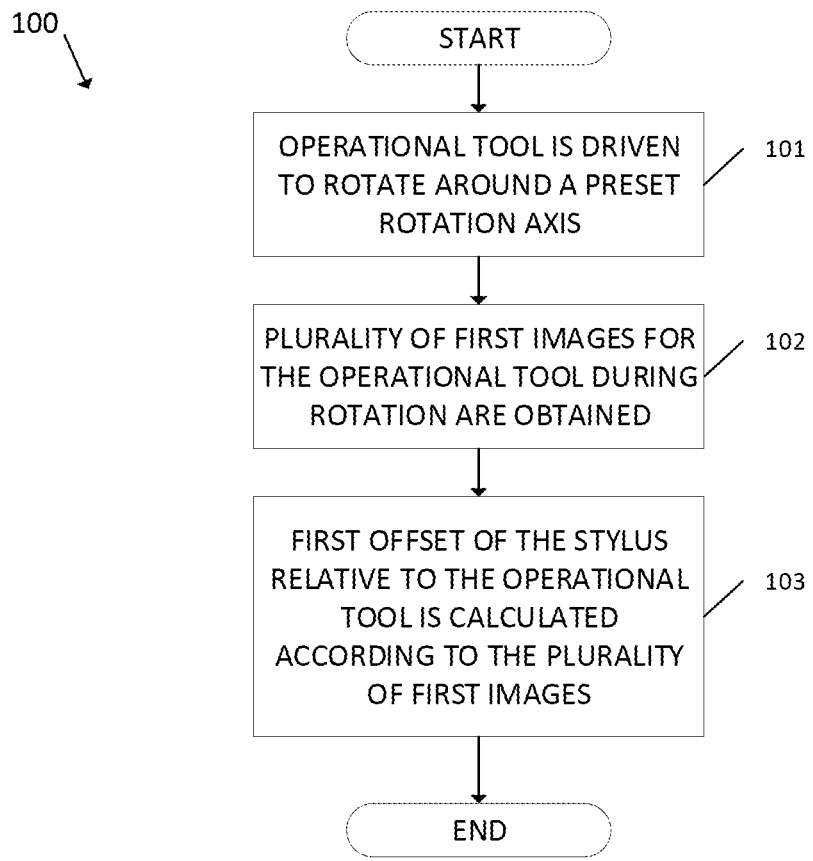

While performing Tool Center Point calibration by using the stylus, since there is an offset between the stylus and an operational tool of the robot, the position of the Tool Center Point resulting from the calibration has an error. Therefore, with reference to FIG. 1, this figure schematically shows a flowchart of a method 100 for estimating a systematic error of a commissioning tool of an industrial robot according to one embodiment of the present invention. As shown in FIG. 1, the method 100 may comprise steps 101 to 103 as below.

In the step 101, the operational tool is driven to rotate around a preset rotation axis.

Figure 2:
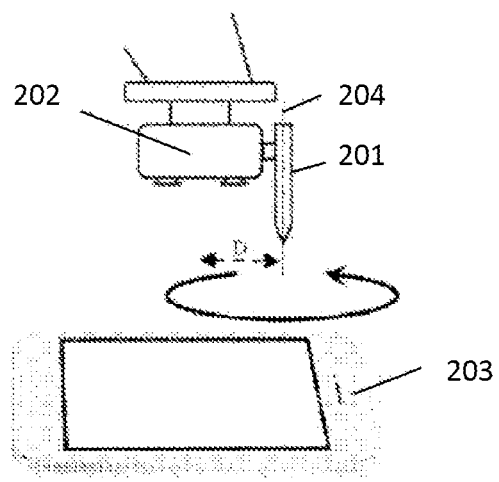
FIG. 2 schematically shows a schematic view of position relations between a commissioning camera, a stylus and an operational tool when estimating a first offset according to one embodiment of the present invention.

As shown in FIG. 2, according to one embodiment of the present invention, the preset rotation axis may be a long axis 204 of a stylus 201.

According to another embodiment of the present invention, the preset rotation axis may further be any axis parallel to the long axis 204 of the stylus, with a known distance to the long axis of the stylus.

According to one embodiment of the present invention, an operational tool 202 may rotate around the preset rotation axis under the control of the robot. For example, when the operational tool rotates around the long axis 204 of the stylus 201, it may be considered the stylus 201 is substantially stationary while the operational tool turns along the direction as indicated by arc arrows in FIG. 4.

In step 102, a plurality of first images for the operational tool during rotation are obtained.

According to one embodiment of the present invention, as shown in FIG. 2, a camera 203 in a mobile phone or a tablet computer may be used as the commissioning camera. The camera 203 is arranged, in advance, at a place where multiple positions of operational tool 202 during rotation can be captured. When the operational tool 202 starts rotating, the camera 203 may capture a plurality of first images, each of which may contain the position of the operational tool at the shooting moment.

In step 103, a first offset of the stylus relative to the operational tool is calculated according to the plurality of first images, so as to obtain a systematic error.

Figure 3:
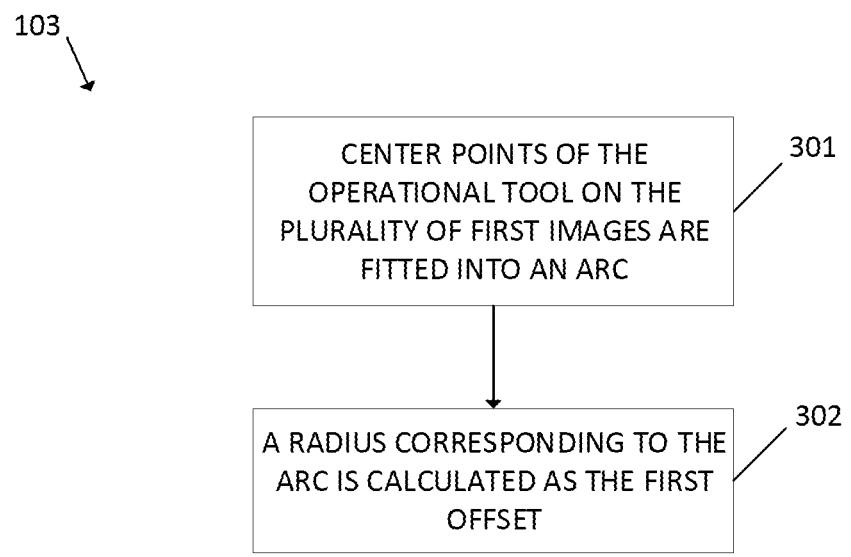
FIG. 3 schematically shows a flowchart of estimating the first offset according to a plurality of first images during estimating a systematic error of a commissioning tool of an industrial robot according to one embodiment of the present invention.

With reference to FIG. 3, this figure schematically shows a flowchart of calculating a first offset according to the plurality of first images during estimating a systematic error of a commissioning tool of an industrial robot according to one embodiment of the present invention. According to one embodiment of the present invention, as shown in FIG. 3, step 103 may comprise sub-steps 301 and 302.

In the sub-step 301, center points of the operational tool on the plurality of first images are fitted into an arc.

Figure 4:
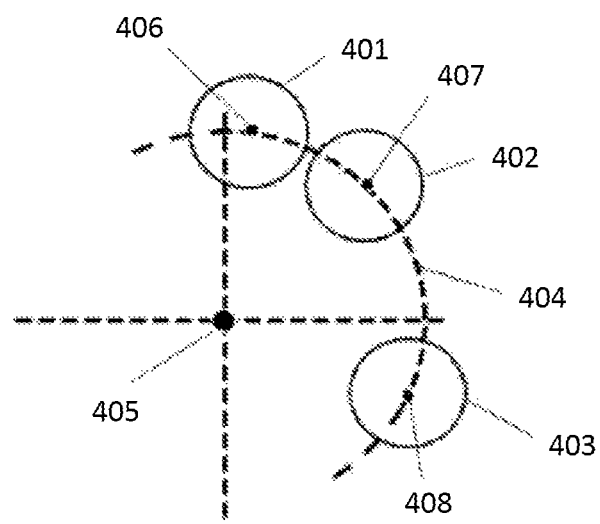
FIG. 4 schematically shows a schematic view of fitting multiple position data to an arc when estimating the first offset according to the plurality of first images according to one embodiment of the present invention.

As shown in FIG. 4, on the plurality of images obtained by the commissioning camera, center point positions of the operational tool may be 401, 402 and 403, and principal points of these images may be 406, 407 and 408. With these center points, an arc 404 may be fitted. And a point 405 may represent the position of the rotation axis on images.

In the sub-step 302, a radius corresponding to the arc is calculated as the first offset.

As shown in FIG. 4, the radius of the resultant arc 404 represents a distance from the operational tool to the rotation axis. When the rotation axis is the long axis of the stylus, the distance is the first offset; when the rotation axis is a certain axis parallel to the long axis of the stylus, the first offset may be the arc's radius plus the distance from the rotation axis to the long axis of the stylus.

Since there is also an offset between the commissioning camera coordinate system and the robot motion coordinate system, and the offset has not been calibrated, the precision of the first offset obtained through the above steps might not be high enough. Thereby, with reference to FIG. 5, this figure schematically shows a flowchart of a method 500 for estimating a systematic error of a commissioning tool of an industrial robot according to another embodiment of the present invention. According to another embodiment of the present invention, the method 500 may comprise steps 501 to 506. Among them, the steps 501 to 503 are similar to the above steps 101 and 103 and thus are ignored here.

In the step 504, when the radius is larger than a preset first threshold value or a difference between the last two calculated radiuses is larger than a preset second threshold value, the flow proceeds to the step 505 or else to the step 506.

If the radius is larger than the preset first threshold value or the difference between the last two calculated radiuses is larger than the preset second threshold value, this means an offset between the commissioning camera coordinate system and the robot motion coordinate system makes the estimated result of the first offset not accurate enough. Therefore, the flow may proceed to the step 505.

In the step 505, the position of the rotation axis is updated.

In the robot motion coordinate system, the commissioning tool may be driven to move by a distance represented by the first offset, and then a long axis of the commissioning tool in the new position or an axis parallel to the long axis may be used as the updated rotation axis. Further, the flow returns to the step 101 according to the position of the updated rotation axis, and a further first offset is re-estimated by iteratively executing the steps 101 to 103.

In the step 506, the last obtained first offset is used as a final estimated value of the first offset.

When the radius of the last obtained arc does not exceed the preset threshold value or the difference between the radiuses of the last two calculated arcs does not exceed the preset second threshold value, it may be considered the precision of the estimated value of the first offset is high enough, the iteration may end, and the radius of the last obtained arc is used as a final output of the estimated value of the first offset.

Figure 5:
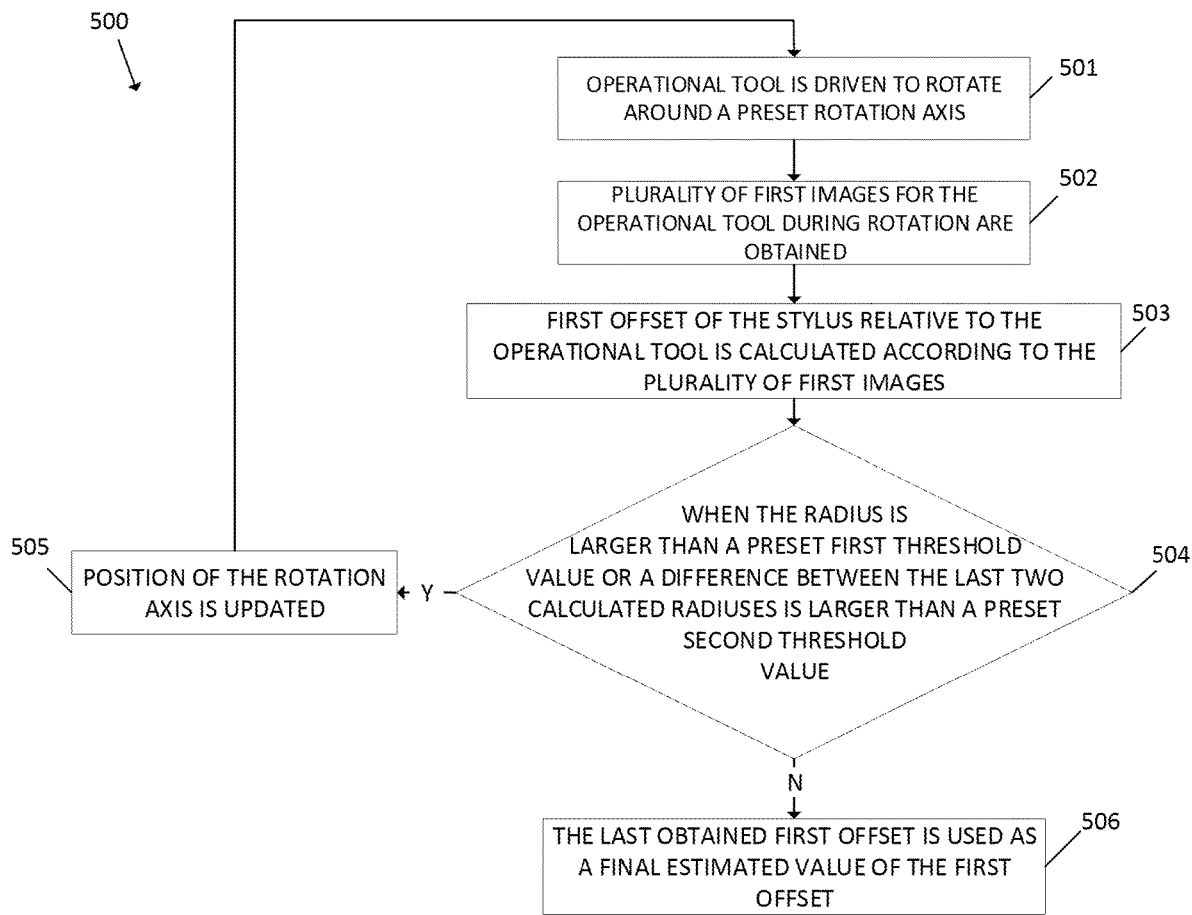
FIG. 5 schematically shows a flowchart of a method for estimating a systematic error of a commissioning tool of an industrial robot according to another embodiment of the present invention.

With the method 500 shown in FIG. 5, a systematic error caused by the first offset between the stylus and the real operational tool may be estimated more accurately.

While performing hand-eye calibration during industrial robot commissioning, a relation between the robot motion coordinate system and the application camera coordinate system may be obtained from a relation between the robot motion coordinate system and the touchscreen coordinate system, and between the touchscreen coordinate system and the application camera coordinate system.

Nevertheless, since the touchscreen actually has two coordinate systems with a certain offset, one of which is the coordinate system of a touch frame in the touchscreen and the other of which is the coordinate system of a display frame in the touchscreen. When obtaining the relation between the robot motion coordinate system and the touchscreen coordinate system, what is actually obtained is a relation between the robot motion coordinate system and the touch frame coordinate system; when obtaining the relation between the touchscreen coordinate system and the application camera coordinate system, what is actually obtained is a relation between the display frame coordinate system and the application camera coordinate system. Inevitably, the relation between the robot motion coordinate system and the application camera coordinate system calculated as such contains an offset, which is an offset between the touch frame coordinate system and the display frame coordinate system in the touchscreen, i.e. a second offset as mentioned in the present patent. If the offset can be estimated, then the systematic error of the commissioning tool of the industrial robot can be reduced further.

Figure 6:
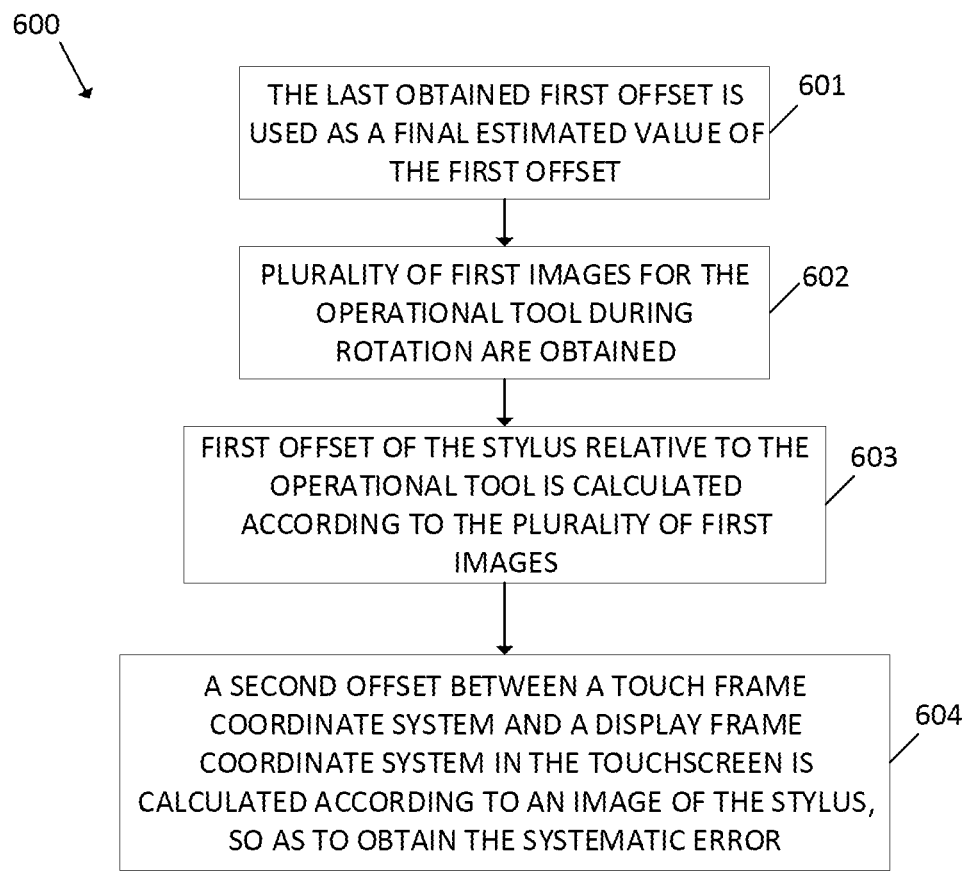
FIG. 6 schematically shows a flowchart of a method for estimating a systematic error of a commissioning tool of an industrial robot according to a further embodiment of the present invention.

Therefore, with reference to FIG. 6, this figure schematically shows a flowchart of a method 600 for estimating a systematic error of a commissioning tool of an industrial robot according to a further embodiment of the present invention. As shown in FIG. 6, the method 600 may comprise steps 601 to 604, among which the steps 601 to 603 are similar to the above steps 101 and 103 and thus are ignored here.

In the step 604, a second offset between a touch frame coordinate system and a display frame coordinate system in the touchscreen is calculated according to an image of the stylus, so as to obtain the systematic error.

According to one embodiment of the present invention, usually the second offset between the touch frame coordinate system and the display frame coordinate system in the touchscreen may be calculated according to an image containing position information of the stylus and a principal point position of a camera capturing the image.

Figure 7:
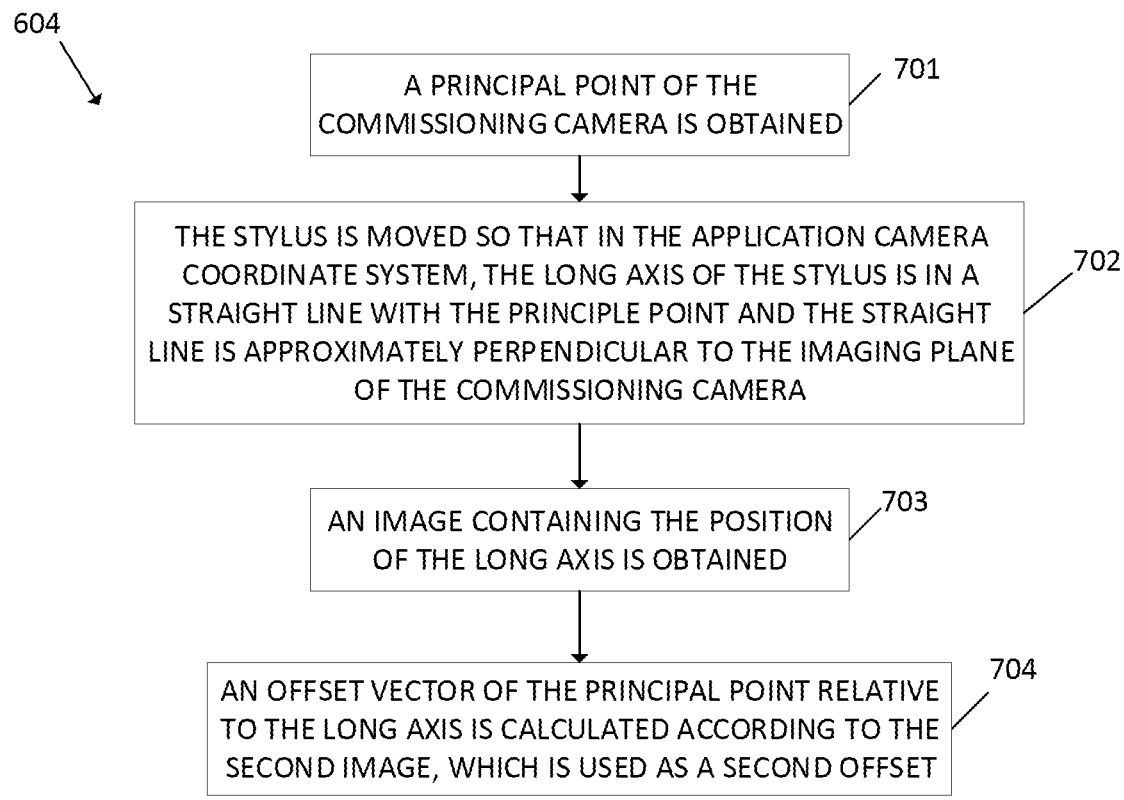
FIG. 7 schematically shows a flowchart of a step 604 in the embodiment shown in FIG. 6 according to one embodiment of the present invention.

According to one embodiment of the present invention, with reference to FIG. 7, this figure schematically shows a flowchart of the step 604 according to one embodiment. As shown in FIG. 7, the step 604 may further comprise sub-steps 701 to 704.

In the sub-step 701, a principal point of the commissioning camera is obtained.

The principle point of the camera may be an intersection point between a center optical axis of the commissioning camera and its imaging plane (e.g. plane where an imaging sensor CCD is located). For a camera, its principal point position is fixed.

According to one embodiment of the present invention, coordinates of the principal point position of the commissioning camera may be obtained using any existing technical solution.

In the sub-step 702, the stylus is moved so that in the application camera coordinate system, the long axis of the stylus is in a straight line with the principle point and the straight line is approximately perpendicular to the imaging plane of the commissioning camera.

Figure 8:
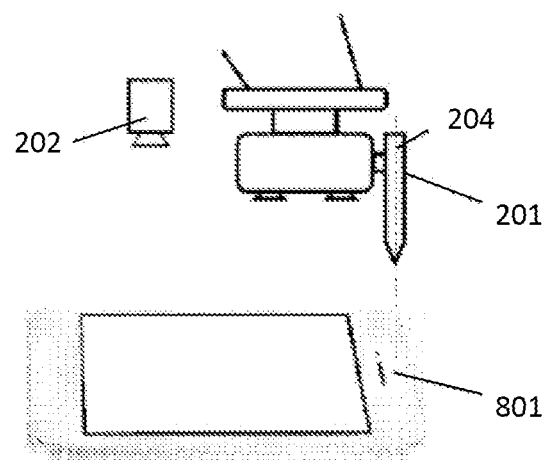
FIG. 8 schematically shows a schematic view of position relations between the commissioning camera, the stylus and the operational tool when estimating a second offset according to one embodiment of the present invention.

As shown in FIG. 8, first a commissioning camera 801 may be arranged within the sight range of an application camera 802, and then in the robot motion coordinate system, the stylus 201 is moved to a position where its long axis 204 is in a straight line with the principal point of the commissioning camera 801 and the straight line is approximately perpendicular to the imaging plane of the commissioning camera.

In the sub-step 703, an image containing the position of the long axis is obtained.

Figure 9:
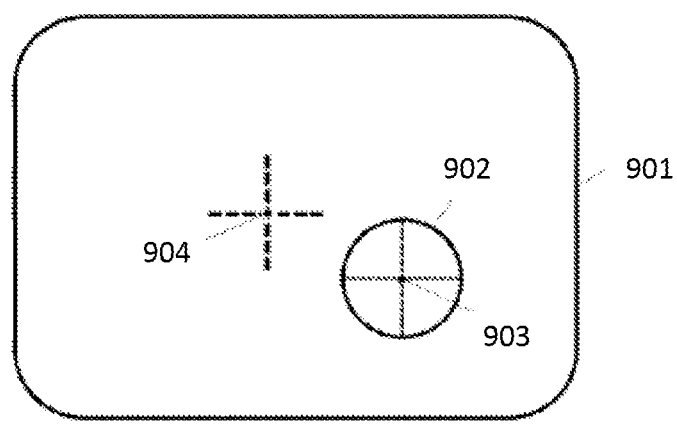
FIG. 9 schematically shows a schematic view of an image containing a stylus position when estimating the second offset according to one embodiment of the present invention.

According to one embodiment of the present invention, the image may be obtained with the commissioning camera. As shown in FIG. 9, the image 901 may contain an image 902 of the stylus and a position point 903 of the long axis of the stylus. The position point 903 may be obtained according to the image 902 of the stylus.

In the sub-step 704, an offset vector of the principal point relative to the long axis is calculated according to the second image, which is used as a second offset.

An offset vector of a principal point 904 relative to the position point 903 of the long axis may be obtained from the second image 901, which is then used as the second offset to reflect the systematic error caused by an offset between the touch frame coordinate system and the display frame coordinate system in the touchscreen.

Figure 10:
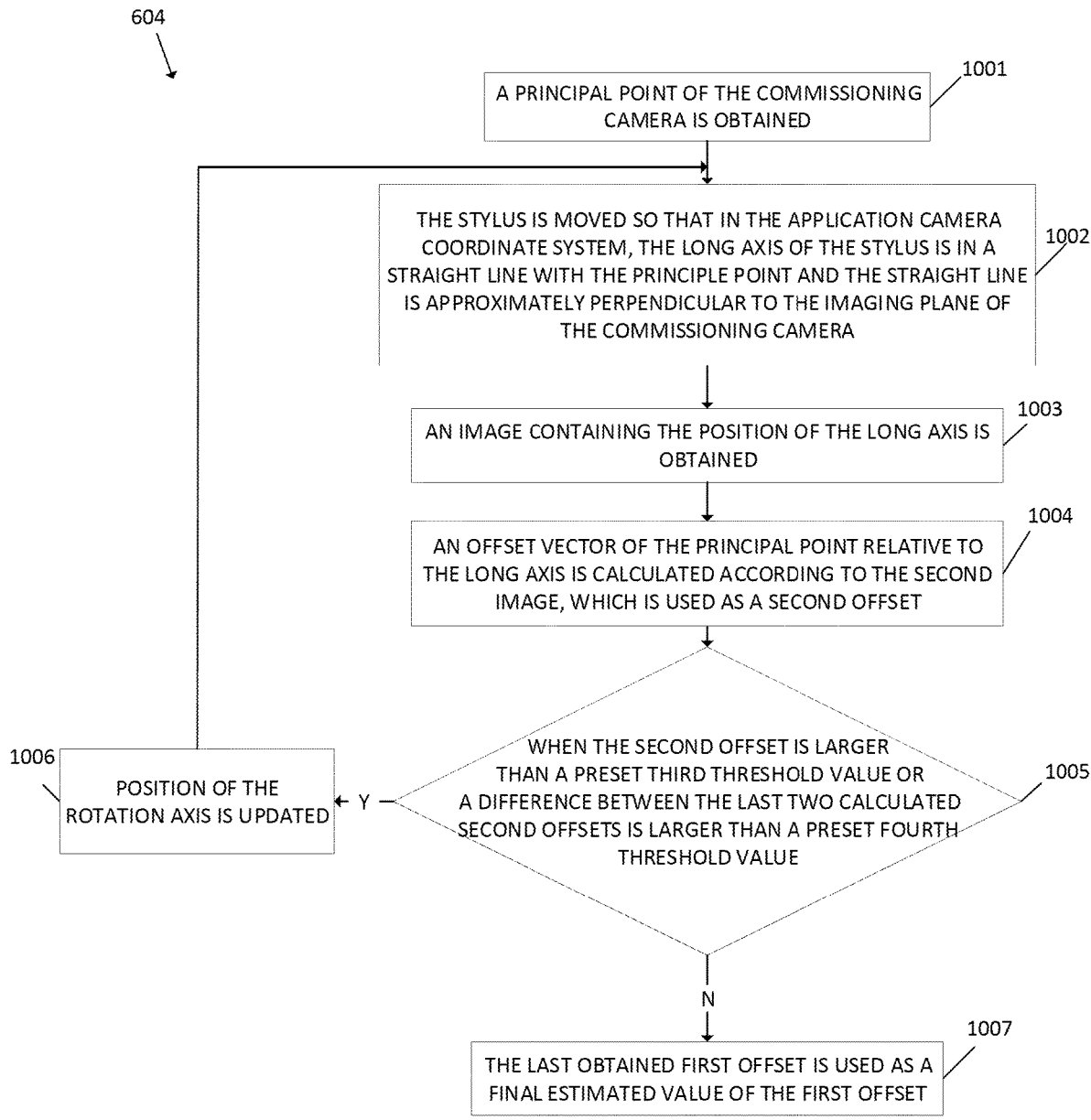
FIG. 10 schematically shows a flowchart of the step 604 in the embodiment shown in FIG. 6 according to another embodiment of the present invention.

Since there is also an offset between the commissioning camera coordinate system and the robot motion coordinate system and the offset is not yet calibrated, the precision of the second offset obtained through the above steps might not be high enough. Therefore, with reference to FIG. 10, this figure schematically shows a flowchart of the step 604 according to another embodiment. As shown in FIG. 10, the step 604 may comprise sub-steps 1001 to 1007, among which the sub-steps 1001 to 1004 are similar to the above sub-steps 701 to 704 and thus are ignored here.

In the sub-step 1005, when the second offset is larger than a preset third threshold value or a difference between the last two calculated second offsets is larger than a preset fourth threshold value, the flow proceeds to the sub-step 1006, or else to the sub-step 1007.

If the second offset is larger than the preset third threshold value or the difference between the last two calculated second offsets is larger than the preset fourth threshold value, this means an estimated result of the second offset caused by an offset between the commissioning camera coordinate system and the robot coordinate system is not accurate enough. Therefore, the flow may proceed to the sub-step 1006 to further estimate the second offset by means of iteration.

In the sub-step 706, the position of the stylus is adjusted according to the second offset, and the flow returns to the sub-step 1002 to iteratively execute the sub-steps 1002 to 1004.

Specifically, in the robot motion coordinate system, the stylus may be moved according to the second offset estimated in the sub-step 1004, and then the flow returns to the sub-step 702 to re-estimate the second offset by iteratively executing the sub-steps 1002 to 1004 according to the updated stylus position.

In the sub-step 1007, the last obtained second offset is used as a final estimated value of the second offset.

When the last obtained second offset does not exceed the preset third threshold value or the difference between the last two calculated second offsets does not exceed the present fourth threshold value, it may be considered the precision of the estimated value of the second offset is high enough, the iteration process may end, and the last obtained estimated value of the second offset is used as a final output value.

Description has been presented to the method for estimating a systematic error of a commissioning tool of an industrial robot according to the embodiments of the present invention. With the method, the systematic error of the tool for industrial robot commissioning may be estimated automatically; and the precision of industrial robot commissioning may be increased without any extra hardware being added.

The present invention further provides an apparatus for estimating a systematic error of a commissioning tool of an industrial robot.

The industrial robot includes an operational tool and an application camera, and the commissioning tool includes a touchscreen and a stylus.

Figure 11:
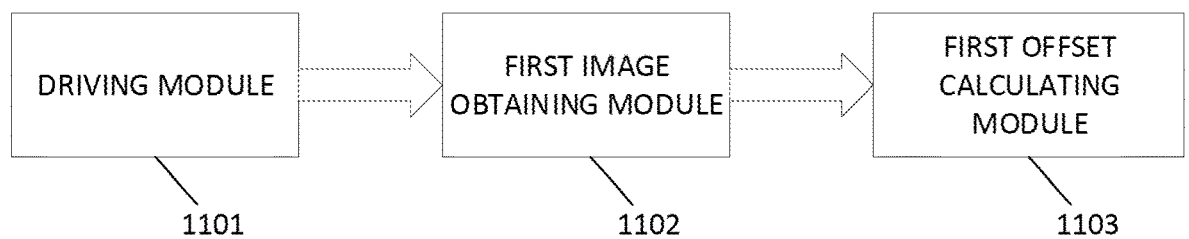
FIG. 11 schematically shows a block diagram of an apparatus for estimating a systematic error of a commissioning tool of an industrial robot according to one embodiment of the present invention.

With reference to FIG. 11, this figure schematically shows a block diagram of an apparatus 1100 for estimating a systematic error of a commissioning tool of an industrial robot according to one embodiment of the present invention. As shown in FIG. 11, the apparatus 1100 may comprise: a driving module 1101 arranged to drive the operational tool to rotate around a preset rotation axis; a first image obtaining module 1102 arranged to obtain a plurality of first images of the operational tool during rotation; and a first offset calculating module 1103 arranged to calculate a first offset of the stylus relative to the operational tool according to the plurality of first images, so as to obtain the systematic error.

According to one embodiment of the present invention, the preset rotation axis may be a long axis of the stylus or may be parallel to the long axis of the stylus.

According to one embodiment of the present invention, the first offset calculating module 1103 may further comprises: a fitting module arranged to fit center points of the operational tool on the plurality of first images to an arc; and a radius calculating module arranged to calculate a radius corresponding to the arc, as the first offset.

According to one embodiment of the present invention, the apparatus 1100 may further comprise: a rotation axis position updating module arranged to update the position of the rotation axis according to the first offset when the radius is larger than a preset first threshold value or a difference between the last two calculated radiuses is larger than a preset second threshold value.

According to one embodiment of the present invention, the apparatus 1100 may further comprise: a second offset calculating module arranged to calculate a second offset between a touch frame coordinate system and a display frame coordinate system in the touchscreen according to an image of the stylus.

According to one embodiment of the present invention, the second offset calculating module may further comprise: a principal point obtaining module arranged to obtain a principal point of the commissioning camera; a stylus moving module arranged to move the stylus so that in the application camera coordinate system, the long axis of the stylus is in a straight line with the principal point and the straight line is approximately perpendicular to an imaging plane of the commissioning camera; a second image obtaining module arranged to obtain a second image containing the position of the long axis; and an offset vector calculating module arranged to calculate an offset vector of the principal point relative to the long axis according to the second image, as a second offset.

According to one embodiment of the present invention, the apparatus 1100 may further comprise: a stylus position adjusting module arranged to adjust the position of the stylus according to the second offset when the second offset is larger than a preset third threshold value or a difference between the last two calculated second offsets is larger than a preset fourth threshold value.

According to one embodiment of the present invention, the image may be obtained by the commissioning camera.

Description has been presented to the apparatus for estimating a systematic error of a commissioning tool of an industrial robot according to the embodiments of the present invention. With the apparatus, the systematic error of the tool for industrial robot commissioning may be estimated automatically; and the precision of industrial robot commissioning may be increased without any extra hardware being added.

The embodiments of the present invention have been illustrated above, but are not intended to limit the present invention. Various variations and changes to the present invention will be apparent to those skilled in the art. Any modification, equivalent replacement, improvement and so on as made under the spirit and principle of the present invention should be included in the scope of the claims of the present invention.

The invention claimed is:

1. A method for estimating a systematic error of a commissioning tool of an industrial robot, the industrial robot comprising an operational tool and an application camera, the commissioning tool comprising a touchscreen and a stylus, the method comprises:
   driving the operational tool to rotate around a preset rotation axis, wherein, the preset rotation axis is a long axis of the stylus or is parallel to the long axis of the stylus;
   obtaining a plurality of first images of the operational tool during rotation; and calculating a first offset of the stylus relative to the operational tool according to the plurality of first images, so as to obtain the systematic error.

2. The method according to claim 1, wherein calculating the first offset further comprises:
fitting center points of the operational tool on the plurality of first images to an arc; and
calculating a radius corresponding to the arc, as the first offset.

3. The method according to claim 2, further comprising:
updating the position of the preset rotation axis according to the first offset when the radius is larger than a preset first threshold value or a difference between the last two calculated radiuses is larger than a preset second threshold value; and
iteratively driving the operation tool, obtaining the plurality of first images, and calculating the first offset.

4. The method according to claim 1, further comprising:
calculating a second offset between a touch frame coordinate system and a display frame coordinate system in the touchscreen according to an image of the stylus.

5. The method according to claim 4, wherein the second offset calculating step further comprises:
obtaining a principal point of a commissioning camera;
moving the stylus so that in the application camera coordinate system, the long axis of the stylus is in a straight line with the principal point and the straight line is approximately perpendicular to an imaging plane of the commissioning camera;
obtaining a second image containing the position of the long axis; and
calculating an offset vector of the principal point relative to the long axis according to the second image, as a second offset.

6. The method according to claim 5, further comprising:
adjusting the position of the stylus according to the second offset when the second offset is larger than a preset third threshold value or a difference between the last two calculated second offsets is larger than a preset fourth threshold value; and
iteratively executing the stylus moving step, the second image obtaining step and the offset vector calculating step.

7. The method according to claim 1, wherein the plurality of first images is obtained by a commissioning camera.

8. An apparatus for estimating a systematic error of a commissioning tool of an industrial robot, the industrial robot comprising an operational tool and an application camera, the commissioning tool comprising a touchscreen and a stylus, the apparatus comprises:
a driving module arranged to drive the operational tool to rotate around a preset rotation axis, wherein, the preset rotation axis is a long axis of the stylus or is parallel to the long axis of the stylus;
a first image obtaining module arranged to obtain a plurality of first images of the operational tool during rotation; and
a first offset calculating module arranged to calculate a first offset of the stylus relative to the operational tool according to the plurality of first images, so as to obtain the systematic error.

9. The apparatus according to claim 8, wherein the first offset calculating module further comprises:

a fitting module arranged to fit center points of the operational tool on the plurality of first images to an arc; and
a radius calculating module arranged to calculate a radius corresponding to the arc, as the first offset.

10. The apparatus according to claim 9, further comprising:
a rotation axis updating module arranged to update the position of the rotation axis according to the first offset when the radius is larger than a preset first threshold value or a difference between the last two calculated radiuses is larger than a preset second threshold value.

11. The apparatus according to claim 8, further comprising:
a second offset calculating module arranged to calculate a second offset between a touch frame coordinate system and a display frame coordinate system in the touchscreen according to an image of the stylus.

12. The apparatus according to claim 11, wherein the second offset calculating module further comprises:
a principal point obtaining module arranged to obtain a principal point of the commissioning camera;
a stylus moving module arranged to move the stylus so that in the application camera coordinate system, the long axis of the stylus is in a straight line with the principal point and the straight line is approximately perpendicular to an imaging plane of the commissioning camera;
a second image obtaining module arranged to obtain a second image containing the position of the long axis; and
an offset vector calculating module arranged to calculate an offset vector of the principal point relative to the long axis according to the second image, as a second offset.

13. The apparatus according to claim 12, further comprising:
a stylus position adjusting module arranged to adjust the position of the stylus according to the second offset when the second offset is larger than a preset third threshold value or a difference between the last two calculated second offsets is larger than a preset fourth threshold value.

14. The apparatus according to claim 8, wherein the plurality of first images is obtained by a commissioning camera.

15. The method according to claim 6, wherein the plurality of first images is obtained by the commissioning camera.

16. The method according to claim 3, wherein the plurality of first images is obtained by a commissioning camera.

17. The method according to claim 5, wherein the plurality of first images is obtained by the commissioning camera.

18. The apparatus according to claim 10, wherein the plurality of first images is obtained by a commissioning camera.

19. The apparatus according to claim 13, wherein the plurality of first images is obtained by a commissioning camera.

20. The apparatus according to claim 9, wherein the plurality of first images is obtained by a commissioning camera.

* * * * *